United States Patent
Serkh et al.

(10) Patent No.: US 7,086,373 B2
(45) Date of Patent: Aug. 8, 2006

(54) DAMPED ACCESSORY DRIVE SYSTEM INCLUDING A MOTOR/GENERATOR

(75) Inventors: Alexander Serkh, Troy, MI (US); Imtiaz Ali, Rochester Hills, MI (US)

(73) Assignee: The Gates Corporation, Denver, CO (US)

( * ) Notice: Subject to any disclaimer, the term of this patent is extended or adjusted under 35 U.S.C. 154(b) by 280 days.

(21) Appl. No.: 10/286,669

(22) Filed: Nov. 1, 2002

(65) Prior Publication Data

US 2004/0084008 A1 May 6, 2004

(51) Int. Cl.
 *F02B 77/00* (2006.01)

(52) U.S. Cl. .............................. 123/198 R; 123/195 A
(58) Field of Classification Search ............. 123/198 R, 123/195 A
See application file for complete search history.

(56) References Cited

U.S. PATENT DOCUMENTS 4,557,709 A * 12/1985 St. John ..................... 474/117
4,758,208 A   7/1988 Bartos et al. ............... 474/135
5,354,242 A * 10/1994 St. John ..................... 474/135
5,935,032 A *  8/1999 Bral .......................... 474/117

FOREIGN PATENT DOCUMENTS

| JP | 11-190222   | 7/1999 |
| JP | 11-190223   | 7/1999 |
| JP | 2000-230612 | 8/2000 |
| JP | 2001-059555 | 3/2001 |
| JP | 2001-099249 | 4/2001 |

* cited by examiner

*Primary Examiner*—Thomas Denion
*Assistant Examiner*—Zelalem Eshete
(74) *Attorney, Agent, or Firm*—C. H. Castleman, Esq.; J. A. Thurnau, Esq.; J. L. Mahurin, Esq.

(57) ABSTRACT

The invention is an improved internal combustion engine having a crankshaft, an accessory, a motor/generator, and a belt-drive system. The belt drive systems includes a crankshaft pulley, an accessory pulley, a motor/generator pulley, a belt tensioner, a belt tensioner pulley, and a power transmission belt trained about the crankshaft pulley, the accessory pulley, the motor/generator pulley, and the belt tensioner pulley. The belt tensioner pulley contacts the belt at a start-slack-side span. It is improved by the tensioner being asymmetrically biased in a direction tending to cause the power transmission belt to be under tension.

7 Claims, 9 Drawing Sheets

DAMPED ACCESSORY DRIVE SYSTEM INCLUDING A MOTOR/GENERATOR

CROSS-REFERENCE TO RELATED APPLICATIONS

This application claims priority to U.S. Provisional Patent Application Ser. No. 60/336,364, filed Nov. 1, 2001 and entitled Hydraulic Hose Fitting and Method. The subject matter of this application is incorporated herein by this reference.

BACKGROUND OF THE INVENTION

1. Field of the Invention

This invention relates generally to internal combustion engine accessory belt drive systems each having a unitary device performing both the engine starting function and the electrical power generation function, such as a motor/generator sometimes referred to as a Gen-Star. More particularly, it relates to such systems in automotive applications. Specifically, this invention relates to a configuration for belt drive systems each having a motor/generator and each having a damped tensioner.

2. Description of the Prior Art

Internal combustion engines commonly use power transmission belt drive systems to tap power from the engine's crankshaft and deliver it to one or more various engine auxiliaries or accessories. In automotive applications, these accessories include power steering pumps, water pumps, air conditioning compressors, fuel pumps, and alternators. Historically, such engines have had the main power takeoff point at the crankshaft protruding from the rear of the engine to which is attached the drive train for driving the wheels to move the automobile. The accessories are driven from a pulley attached to the front of the crankshaft. Each accessory is equipped with a pulley. All of the pulleys are in mechanical communication via one or more power transmission belts trained about them. Some method of tensioning each power transmission belt is provided. The power transmission belt, the pulleys, and devices accomplishing belt tensioning form the accessory belt drive system.

Earlier systems included multiple v-belts. Commonly, each belt was tensioned by manual adjustment and fixing of the position of at least one accessory or idler per belt. These are referred to as locked-center belt drives, because there is no provision for automatic movement of any of the pulleys to accommodate varying condition of the belt or of the drive as a whole. If the belt should stretch or otherwise lengthen, the tension upon the belt would lessen. Further, for proper operation of the belt drive system, the tension of the belt must be set high enough to accommodate the worst case condition. Such worst case conditions can be the result of extremes of temperature, engine operation, or accessory operation.

There has been interest in making the volume, of the engine compartments of automobiles, smaller. To accommodate the smaller compartments, various aspects of the engines have become smaller, including the accessory belt drive systems. This has been accomplished, at least in part, by reducing the number of belts employed. As each belt is removed, and the number of layers extending from the front of the engine is thereby removed, the total distance the belt drive system extends from the front of the engine is reduced. Ultimately, this has resulted in the use of a single serpentine belt for many applications. A serpentine belt is so named because of the way it snakes around the various pulleys in a series of bends, both forward and backward. A v-ribbed or Micro-V (a registered trademark of The Gates Rubber Company) belt is most suited to serpentine applications.

The limitations of the locked-center approach to belt tensioning are exacerbated in serpentine applications. Accordingly, most modern serpentine belt drives include an automatic tensioner whereby the changing conditions of the belt drive system can be better accommodated. In basic form, an automatic tensioner has a framework, which attaches directly or indirectly to the cylinder block of the engine, and a pulley, which presses upon the belt in the plane of rotation of the belt drive system. A moveable member extends between the framework and the pulley and is biased to provide pressure upon the belt, via the pulley. The pressure acts to lengthen the distance about which the belt is trained and thereby causes the belt to be in tension. Various techniques and geometries have been employed to provide the biasing force. Commonly, a resilient member, such as a steel spring acts to force the moveable member in a linear or rotating motion which results in the pulley tending to move in a direction toward a surface of the belt which, in turn, tends to increase tension upon the belt.

A tensioner with only these elements provides a somewhat constant force upon the surface of the belt when the system is in a resting state (i.e., the pulleys are not rotating). Dimensional instability, of the drive system caused by time, temperature, or manufacturing variation is accommodated fairly well through the action of the resilient member, at least to the limits of linearity of the resilient member and geometry of the tensioner. Thus, the tension upon the belt remains relatively constant, when the system is at rest, even though the belt may have stretched or the engine may be hot or cold. However, a tensioner with only these elements may not maintain appropriate tension upon the belt for all operating conditions of the system.

An operating belt drive system typically oscillates due to the influences of torsional vibration or other angular acceleration of the crankshaft or accessories, the influences of unbalanced conditions, or other influences. Torsional vibration of the crankshaft occurs, in part, as a result of the distinct impulses delivered to the crankshaft through the combustion cycles of each cylinder and piston combination. The oscillations lead to vibration of the belt. This, in turn, leads to vibration of the moveable portions of the tensioner. Momentum then builds in those moveable portions modifying the force the pulley exerts upon the belt surface and the tension upon the belt. The changing tension upon the belt can cause unacceptable performance for the belt drive system. In one instance, issues of short-term performance, such as where the belt of the belt drive system slips excessively limiting the system's efficiency or power transmission capability, or is excessively noisy due to slippage or otherwise, can arise. In another instance, the amount of tension necessarily applied to the belt, to have acceptable performance on the short-term, leads to long-term issues such as premature failure of one or more components of the system, including the belt, or one or more accessories.

To accommodate these issues and thus improve the performance of tensioners, damping devices have been included in tensioners. Damped tensioners have included symmetrical damping where movement of the moveable portions of the tensioners are damped approximately equally whether the instantaneous movement is in the direction tending to increase tension upon the belt or in the direction tending to decrease tension upon the belt. Other tensioners have utilized asymmetrical damping. Commonly, such tensioners are damped such that the damping upon the moveable portion is minimal when the tensioner is moving in the belt tensioning direction and maximal when moving in the belt loosening direction.

Figure 2:
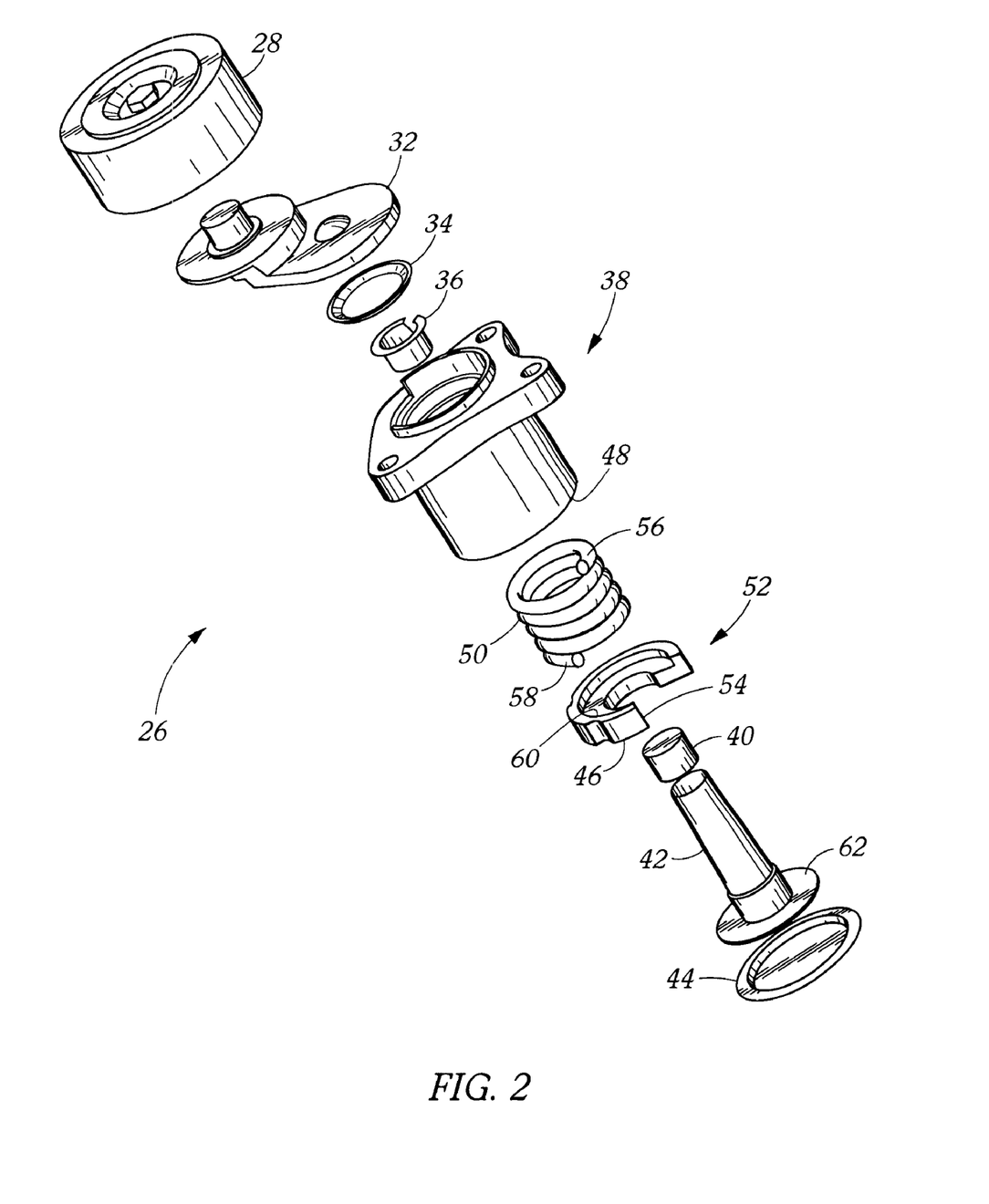
FIG. 2 is an exploded view of a tensioner forming part of a preferred accessory belt drive system including a motor/generator.

Certain approaches to asymmetrical damping have been passive in nature. The mere direction of movement of the moveable portions creates the different damping rates. In one approach, a shoe is biased against a race at an angle different from normal to the surface of the race. As a result, the relative movement of the shoe and race in one direction tends to lift the shoe from the race. This reduces the pressure at their interface, reduces the friction that gives rise to the damping, and thereby reduces the damping. The other direction tends to wedge the shoe against the race and increase the damping, as depicted in FIG. 2. In another approach, described in Meckstroth et al. U.S. Pat. No. 5,439,420, damping fluid is channeled through different orifices by valves depending upon motion to the moveable portions of the tensioner. When the tensioner moves in the tensioning direction, the fluid passes through a relatively large orifice or channel offering little resistance to the fluid movement and little damping. In the loosening direction, the fluid passes through a relatively small orifice or channel offering greater resistance and greater damping.

Another approach to asymmetrical tensioner damping has been active and can be also be found described in '420 patent. In '420 two active asymmetrical embodiments are discussed. In one, an electric solenoid deploys brake shoes. When the shoes are deployed, movement of the tensioner is damped in both directions. Additionally, a wedge cooperates with the shoes to modify the force with which they are deployed when the tensioner moves. The damping increases when the tensioner moves in the loosening direction and decreases when the tensioner moves in the tensioning direction. In another, a solenoid deploys a piston, which modifies a fluid path and thereby modifies the damping. Another tensioner approach described in the '420 patent, is to utilize a solenoid, similar to the two active asymmetrically damped tensioners, including a locking factor to switch the tensioner between two modes of operations. In one mode the tensioner operates as an automatic tensioner. In the other mode, its moveable portions are locked, causing the tensioner to act in much the same manner as a locked-center tensioner.

The '420 patent is directed toward solving unacceptable belt drive system performance created by inertial forces caused by the rotating masses of accessories and idler pulleys when rapidly decelerated. As described therein, when sudden rotational deceleration is produced at the crankshaft of the engine "the high rotational inertia of the alternator causes it to remain rotating and causes the alternator to pull the tensioner in a direction so as to loosen the belt [of the specific drive configuration depicted]. . . . as a result the drivebelt (sic) slips . . . ."

Traditionally, an electric starter motor is provided to spin the crankshaft of the engine so that combustion may be initiated and the engine will begin to run. The starter motor is located near the rear of the engine and is adapted to intermittently engage the rear portion of the crankshaft through a gear train.

Currently, there is increasing pressure to reduce emissions and increase fuel economy by lowering the weight of the automobile and reducing the number of under-the-hood components. An approach taken toward these goals involves combining the function of the starter motor and the function of the alternator into a single device, a motor/generator or a Gen-Star. Also toward the goal of increasing fuel economy, the Gen-Star promotes the use of a feature called "stop-in-idle". This feature is where the engine is allowed to die when it would ordinarily idle, then be restarted when the automobile is expected to resume motion. This feature substantially increases the demands placed upon accessory belt drives. In application, the motor/generator is placed in mechanical communication with the crankshaft via the accessory belt drive. The motor/generator and associated accessory belt drive system tends to be placed at the front of the engine. However, placing these systems at other locations, including the rear of the engine is envisioned.

The advent of Gen-Star systems causes the designer, of power transmission belt drive systems, to face substantial new challenges. A significant challenge, among these, has been to develop a tensioning system that results in acceptable performance, by an accessory belt drive that includes this new device, which not only offers substantial load and rotational inertia, but also adds large driving torque into the accessory belt drive. Further, it provides this large driving torque on an intermittent basis.

A tensioning system stated to be an approach for tensioning an accessory belt drive incorporating either a mere starter motor or a motor/generator is disclosed in two Japanese Patents. One was issued under number 3,129,268, on Nov. 17, 2000. The other was issued under number 3,195,287, on Nov. 21, 2000. In those patents, it is disclosed to place an automatic tensioner against the span of the belt which would become the loosest span at the time the motor/generator is in start mode, but for the presence of the tensioner. This span corresponds to the span that receives the belt immediately after the belt passes over the motor/generator pulley, when the belt is moving in its normal operating direction.

The disclosed tensioning system has been identified as less than optimal. It can be improved to obtain a blending of better performance in the short-term and in the long-term, and a reduction in the width of the belt.

Accordingly, there remains the need for a tensioning system that provides, an improved blend of short-term performance, long-term performance, and reduction in the width of the belt that may be used for any given application.

SUMMARY OF THE INVENTION

The present invention has as an object the provision of an accessory belt drive system that improves the combination of short-term performance, long-term performance, and optimizes belt selection.

The present invention has as a further object the provision of an asymmetrical tensioner in conjunction with a configuration that further optimizes short-term, long-term performance and belt width.

To achieve the foregoing and other objects in accordance with the purpose of the present invention, as embodied and broadly described herein, an accessory drive system including a motor/generator is disclosed. The invention is an improved internal combustion engine having a crankshaft, an accessory, a motor/generator, and a belt-drive system. The belt drive systems includes a crankshaft pulley, an accessory pulley, a motor/generator pulley, a belt tensioner, a belt tensioner pulley, and a power transmission belt trained about the crankshaft pulley, the accessory pulley, the motor/generator pulley, and the belt tensioner pulley. The belt tensioner pulley contacts the belt at a start-slack-side span. It is improved by the tensioner being asymmetrically biased in a direction tending to cause the power transmission belt to be under tension.

BRIEF DESCRIPTION OF THE DRAWINGS

The accompanying drawings, which are incorporated in and form part of the specification in which like numerals designate like parts, illustrate preferred embodiments of the present invention and together with the description, serve to explain the principles of the invention. In the drawings.

DETAILED DESCRIPTION OF THE PREFERRED EMBODIMENTS

Figure 1:
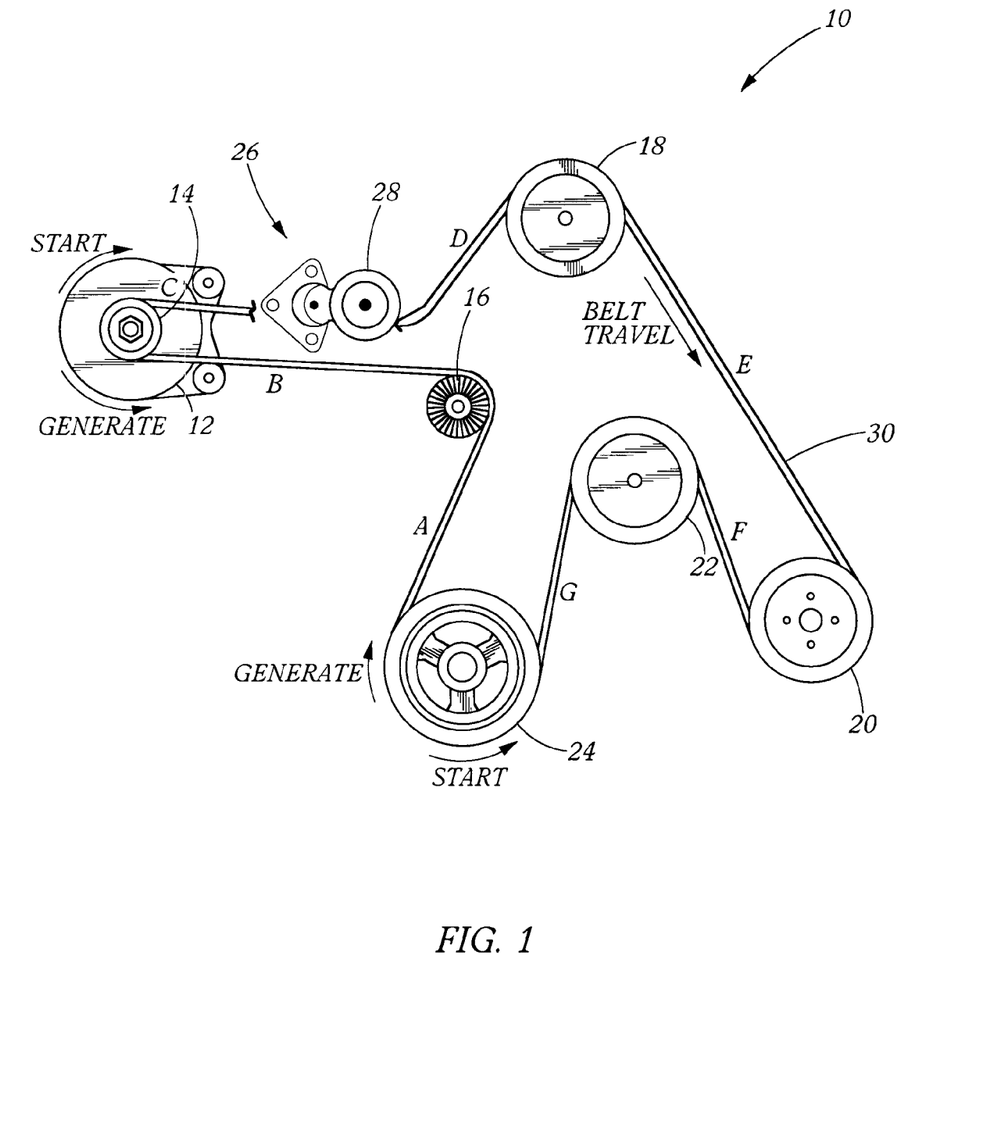
FIG. 1 depicts a schematic representation of a preferred embodiment of an accessory belt drive system configuration including a motor/generator.

A preferred embodiment of an accessory belt drive system 10 is depicted in FIG. 1. It includes motor/generator 12, motor/generator pulley 14, tensioner 26, tensioner pulley 28, power steering pump pulley 18, water pump pulley 20, air conditioning compressor pulley 22, crankshaft pulley 24, idler pulley 16, and power transmission belt 30. The portion of power transmission belt 30 that would otherwise obscure tensioner 26 is broken away.

While specific accessory pulleys in a specific geometrical arrangement are depicted, it should be recognized that the instant invention applies to various numbers and combinations of accessories and geometrical arrangements, including both serpentine and non-serpentine configurations, depending upon application. The configuration depicted is serpentine. Thus, power transmission belt 30 would ordinarily be of the v-ribbed type. However, the invention can be practiced with the inclusion of all belt types. Further, this depiction also can be viewed as one plane of belt/pulleys in an accessory belt drive system having multiple belts.

The arrow labeled "belt travel" indicates direction of belt travel during normal operation in both generate and start modes. To move downstream, along the path trained by power transmission belt 30, is to move in the same direction as belt travel. To move upstream is to move in the opposite direction of belt travel.

The direction of torque at motor/generator pulley 14 and at crankshaft pulley 24 reverses depending upon the mode of operation of accessory belt drive system 10, as indicated by the arrows labeled "start" and "generate", at each pulley 14 and 24, respectively. In the generate mode, crankshaft pulley 24 supplies all driving torque. Air conditioning compressor pulley 22, water pump pulley 20, power steering pump pulley 18, and motor/generator pulley 14 consume the driving torque, with minor consumption by idler pulley 16 and tensioner pulley 28. It can be seen that the span that would exist between crankshaft pulley 24 and motor/generator pulley 14, but for the presence of idler pulley 16, is the span that carries the least tension during this mode. This is the generate-slack-side span A/B.

In start mode, motor/generator pulley 14 supplies all driving torque. Crankshaft pulley 24, air conditioning compressor pulley 22, water pump pulley 20, and power steering pump pulley 18 consume the driving torque, with minor consumption by idler pulley 16 and tensioner pulley 28. It can be seen that the span that would exist between motor/generator pulley 14, and steering pump pulley 18, but for the presence of idler pulley 16, is the span that carries the least tension during this mode. This is the start-slack-side span C/D.

Generally and regardless of mode of operation, if it were assumed that each of the pulleys is allowed to rotate freely, tension on every span would be the same and at static tension. Static tension is the result of the force applied to power transmission belt 30 by tensioner 26 via tensioner pulley 28 tending to lengthen the distance power transmission belt 30 is forced to travel about all of the pulleys. This corresponds to the installation or setting tension when the system is first assembled with the tensioner in place and providing tension to the system. However, when torque is being supplied and consumed by the various pulleys, of the accessory belt drive system 10, such as when the accessory belt drive system 10 is operating, the tension in each span is modified.

In the conventional or generate mode, crankshaft pulley 24 and generate-tight-side span G supplies the driving torque and is the span with the greatest tension, respectively. At each span upstream of generate-tight-side span G, tension upon power transmission belt 30 is reduced by the effect of each torque consuming pulley immediately preceding the span. Motor/generator pulley 14 presents the greatest load, in most cases. Accordingly, the largest difference in tension, due to load, normally appears when going from start-slack-side span C/D to generate-slack-side span A/B.

In the conventional accessory v-ribbed belt drive system, the fundamental design considerations are: 1) belt width (commonly denoted by number of ribs) and type selection related to torque anticipated to be supplied and consumed; and, 2) static tension selection to be below that which stresses either the belt or components of the system to the point of reducing the useful life of either below an acceptable term and above the point where unacceptable slippage begins. Further, belt type and width selection affects useful belt life. Also, there is interplay between these two fundamental design considerations.

A constant goal for the accessory belt drive system designer is to optimize both of these considerations, in light of cost and complexity concerns. Optimization is accomplished through manipulation of many geometric and material parameters known to those of ordinary skill in the art. Among these is arrangement of the driving and driven pulleys based upon inertial or other torque each presents.

Drive systems that include a motor/generator present new and difficult limitations and heretofore have alluded practical optimization. The root of the difficulties lies in the fact that the pulleys, which supply the driving torque and present the greatest load and inertial torque are different depending upon mode of operation. Further, larger inertial torque loads are presented than normally encountered in a conventional drive system.

In the start mode, motor/generator 12 supplies the driving torque. Generate-slack-side span A/B is the span with the greatest tension. Unlike the generate mode, crankshaft pulley 24 presents the greatest load. Likewise, the largest tension differential, due to load, is between generate-slack-side span A/B and generate-tight-side span G. As can be seen, a layout that optimizes in the generate mode is substantially different from a layout that optimizes in the start mode.

The layout of the depicted preferred embodiment is described in the prior art. What is not described is the optimization that can be achieved through certain damping factors applied to tensioner 26. A quantitative analysis of the effects of several damping schemes was performed. A layout similar to FIG. 1 with all components being the same, including belt 30 in terms of type and number of ribs, and in the same sequence, was analyzed. Three different tensioner characteristics were applied to the layout. One tensioner did not include damping. One was damped symmetrically with a 20% damping factor. The third was asymmetrically damped with an 80% damping factor in the belt loosening direction and a 30% damping factor in the belt tightening direction. The damping factors were the same for both start and generate modes. All accessory loads and acceleration/deceleration loads were taken into account and used consistently for each of the three tensioner characteristics. Results were produced for installation tension, FIG. 9, tensions in the generate mode with full load required by the motor/generator, FIG. 10, and tensions in the start mode, FIG. 11.

Figure 11:
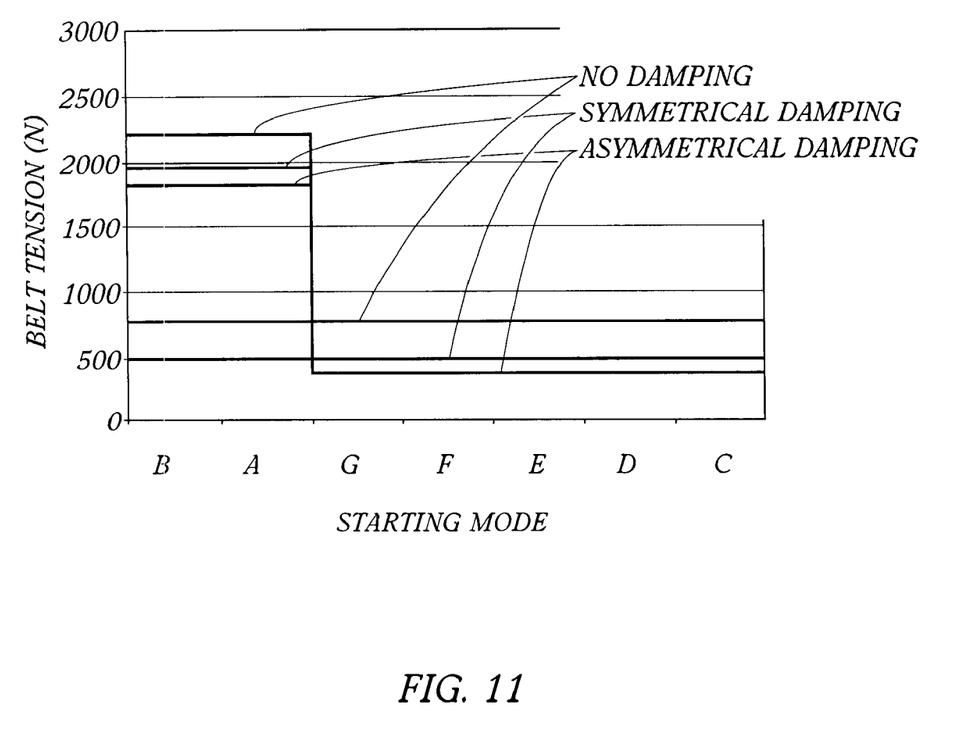
FIG. 11 depicts a graph of starting mode tension over each span of an accessory belt drive system as affected by damping of associated tensioner.

During start, the motor/generator provides torque to drive the crank. Belt tensions in span B and span A will be high while the tensions in the remaining spans will be relatively low. The difference in the tight spans, B and A, and slack spans, G, F, E, D, and C, is the effective tension. The tension in the tight spans causes the belt in these two spans to stretch. This extra portion of the belt accumulates on start-slack-side span C/D resulting in tensioner pulley 28 moving toward belt 30. Where the characteristics of tensioner 26 include damping, the bias to pulley 28 will be lessened and thus the tension in span C/D will then be lessened because of the damping. From a slip threshold analysis of system 10, the tensions required of tight side, span B, and slack side, span C, to transmit the starting torque without belt slip and to operate satisfactorily in all situations expected to encountered by an operating belt drive system, are depicted in FIG. 11.

Figure 10:
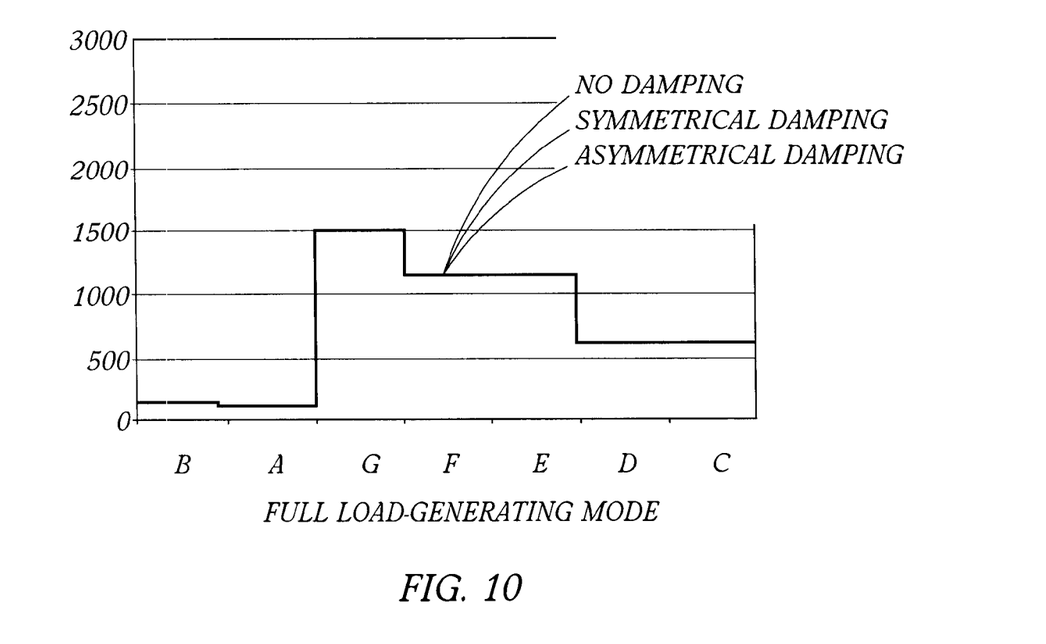
FIG. 10 depicts a graph of full load generating mode tension over each span of an accessory belt drive system as affected by damping of associated tensioner.

FIG. 10 discloses the tension found in each span during generate mode with full load generation operation. During this operation, the span tensions are all the same for each of the levels of damping. Note that the tension drop across the motor/generator is the difference between the tension in span C and span B, 672 N and 115 N, respectively, yielding a drop of 557 N.

Figure 9:
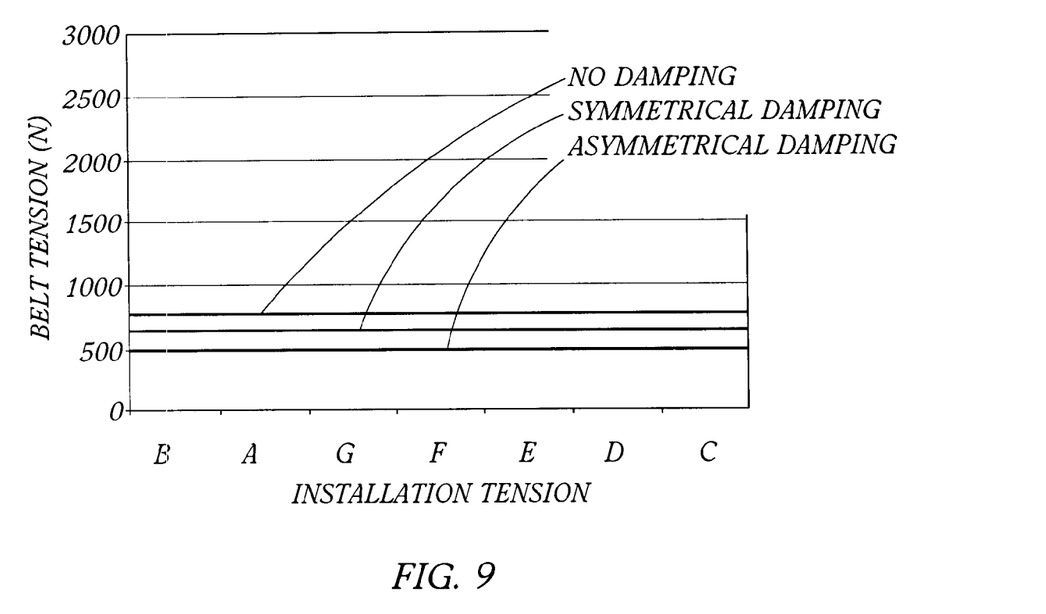
FIG. 9 depicts a graph of installation tension over each span of an accessory belt drive system as affected by damping of associated tensioner.

FIG. 9 discloses the setting tension required for system 10 to perform satisfactorily, with each tensioner 26 damping characteristic modeled. Note that the setting tension required for system 10 with a tensioner 26 having a non-damped characteristic is 679 N, with a tensioner 26 having the symmetrically damped characteristic is 631 N, and with a tensioner 26 having the asymmetrically damped characteristic is 513 N.

It can be seen from these quantitative analyses that the addition of damping to tensioner 26 significantly reduces the amount of tension initially required to be set by tensioner 26. This translates to improved life for belt 10 and all other components, if all other parameters of system 10 remain constant. In the alternative, the belt system designer can choose to take advantage of the damped tensioner characteristic to modify the various components of system 10 to reduce the cost of belt 10 or any of the other components.

In this first preferred embodiment, tensioner 26 comprises tensioner pulley 28, tensioner arm 32, washer 34, first pivot bushing 36, tensioner base 38 including damping race 48, spring 50 including first spring tang 56 and second spring tang 58, damping insert 52 including damping shoe 46, damping shoe wall 54, and tang receiver 60, second pivot bushing 40, pivot shaft 42 including damping shoe abutment 62, and end cap 44. The assembled relationships of the parts of tensionser 26 are obvious from FIG. 2. However, to amplify, spring 50 fits within tensioner base 38 with first spring tang 56 attached thereto (not depicted). Second spring tang 58 rests within tang receiver 60 of damping insert 52. Tensioner arm 32 has a fixed relationship to pivot shaft 42. Upon rotation of tensioner arm 32 in relation to tensioner base 38, torsion is communicated to spring 50 by rotation of pivot shaft 42 rotating damping shoe abutment 62 which abuts damping shoe wall 54. This, in turn, causes a rotation of damping insert 52, which acts upon spring 50 at the junction of tang receiver 60 and second spring tang 58. The distance between damping shoe wall 54 and damping shoe abutment 62, from the center of pivot shaft 42 is the primary determinate of the symmetry of damping created at the interface of damping shoe 46 with damping race 48. The larger is this distance radially, the greater will be the asymmetry of the damping. As depicted, tensioner 26 has the 80% damping factor in the loosening direction and the 30% damping factor in the tightening direction of one of the above quantitative analyses.

For the configuration depicted in FIG. 2, when allowed by condition of power transmission belt 30, spring 50 relaxes. In turn, tensioner pulley 28 supported by tensioner arm 32 revolves about pivot shaft 42 in the clockwise and tensioning direction indicated in FIG. 1. Spring 50 in combination with damping shoe abutment 62 causes damping shoe 46 to press against damping race 48. At the same time, the clockwise motion in conjunction with the geometrical relationship of damping abutment 62 with damping shoe wall 54 causes damping shoe 46 to move clockwise against damping race 48, giving rise to a damping friction. The damping friction tends to subtract from the biasing that tensioner pulley 28 applies to power transmission belt 30. However, the clockwise movement and relationship of damping abutment 62 with damping wall 54, tend to lessen the mating force of shoe 46 with race 48. Thus, the damping friction is lessened when tensioner pulley 28 revolves in the tensioning direction.

When the condition of power transmission belt 30 forces tensioner pulley 28 to revolve in the loosening direction, by overcoming the force provided by spring 50, the counterclockwise movement and relationship of damping shoe abutment 62 with damping shoe wall 54 tend to increase the mating force of shoe 46 with race 48. Thus, damping friction is increased when tensioning pulley 28 revolves in the loosening direction. The damping friction tends to add to the biasing that tensioner pulley 28 applies to power transmission belt 30. Accordingly, tensioner 26 is both asymmetrically biased and damped.

Figure 3:
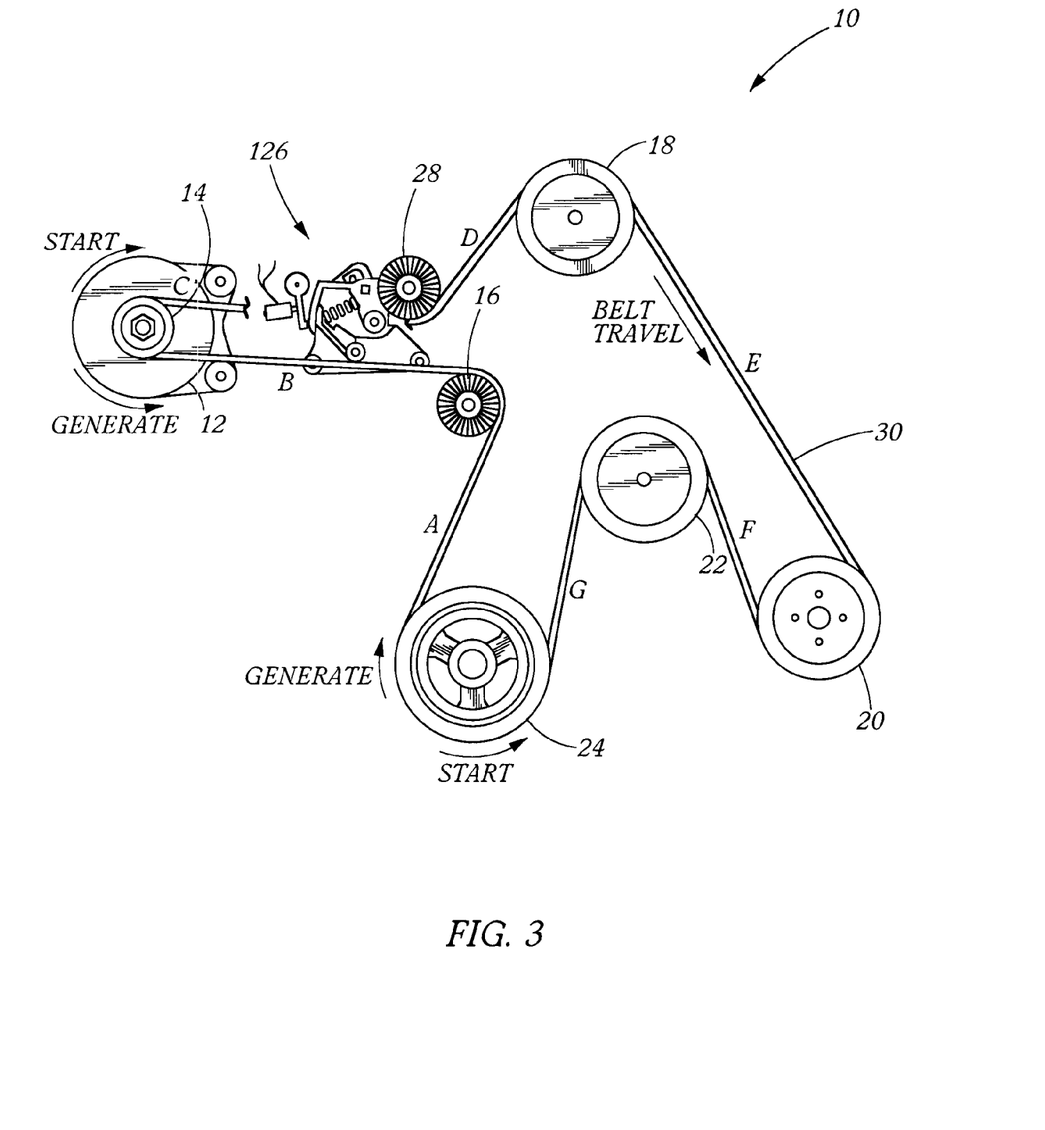
FIG. 3 depicts a schematic representation of an alternate preferred embodiment of an accessory belt drive system configuration including a motor/generator.
Figure 4:
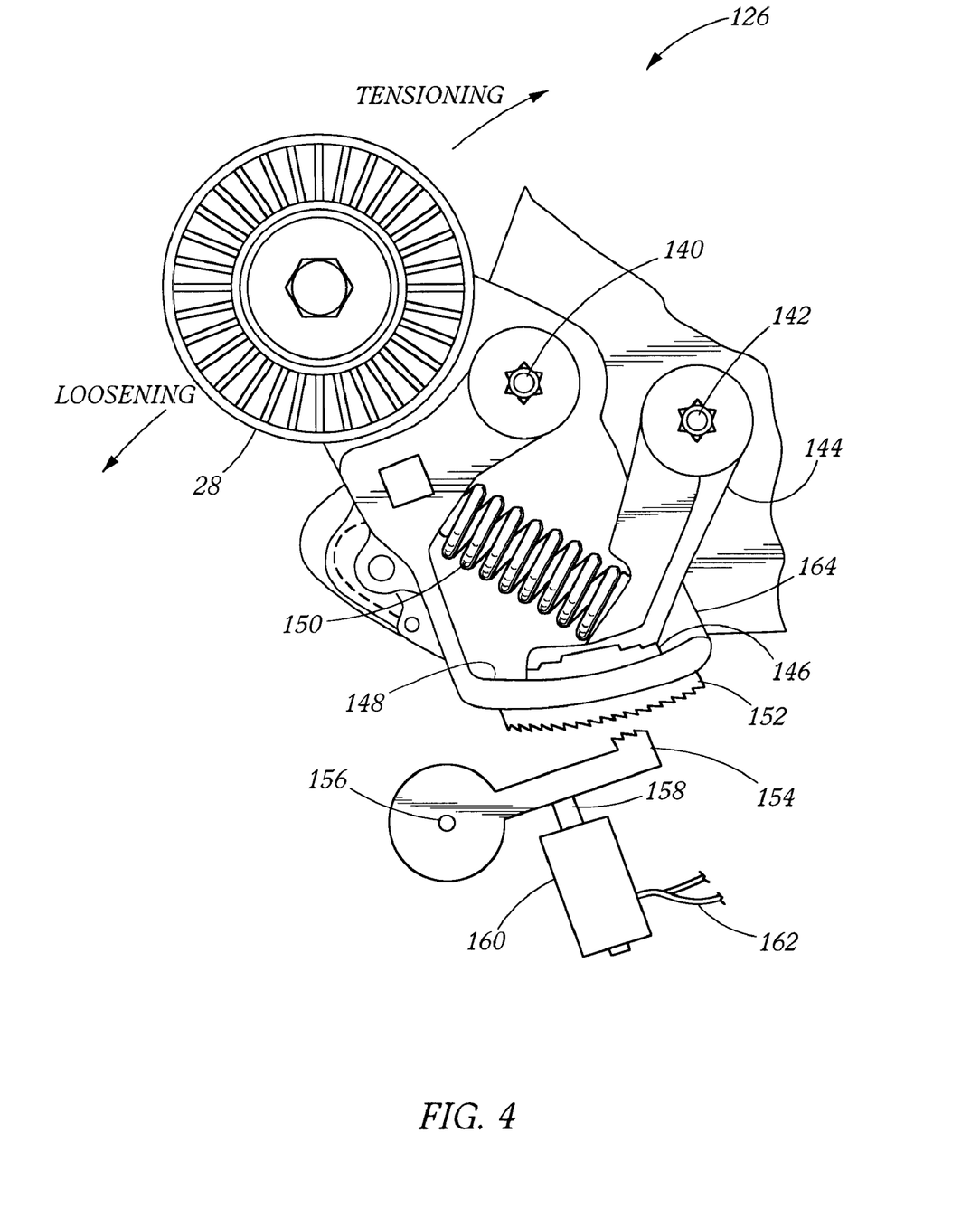
FIG. 4 is a detail of an alternate tensioner forming part of an alternate preferred accessory belt drive system including a motor/generator.

Another preferred embodiment is depicted in FIGS. 3 and 4. Tensioner 126 includes main pivot 140, damper pivot 142, damper arm 144, damper shoe 146, damper race 148, biasing spring 150, ratchet teeth 152, pawl 154, pawl pivot 156, plunger 158, solenoid 160, and conductors 162. Tensioner pulley 28, damper race 148, ratchet teeth 152, biasing spring 150, and main pivot 140 are supported by tensioner frame 164. Biasing spring 150, in this embodiment, is a steel coil. Other resilient members, including elastomeric or pneumatic members, can be employed. Biasing spring 150 acts to bias tensioner pulley 28. In the generate mode, pawl 158 and ratchet teeth 152 are disengaged, as depicted.

When allowed by condition of power transmission belt 30, spring 150 causes the distanced spanned by biasing spring 150 to lengthen. In turn, tensioner pulley 28 supported by tensioner frame 164 revolves about main pivot 140 in the clockwise and tensioning direction indicated in FIG. 4. Biasing spring 150 causes damper arm 144 to press damper shoe 146 against damper race 148. At the same time, the clockwise motion in conjunction with the geometrical relationship of main pivot with damper pivot causes damper race 148 to move clockwise under damper shoe 146, giving rise to a damping friction. The damping friction tends to subtract from the biasing that tensioner pulley 28 applies to power transmission belt 30. However, the clockwise movement and relationship of pivots 140 and 142, tend to lessen the mating force of shoe 146 with race 148. Thus, the damping friction is lessened when tensioner pulley 28 revolves in the tensioning direction.

When the condition of power transmission belt 30 forces tensioner pulley 28 to revolve in the loosening direction, by overcoming the force provided by biasing spring 150, the counterclockwise movement and relationship of main and damper pivots 140 and 142 tend to increase the mating force of shoe 146 with race 148. Thus, damping friction is increased when tensioning pulley 28 revolves in the loosening direction. The damping friction tends to add to the biasing that tensioner pulley 28 applies to power transmission belt 30. Without ratchet teeth 152, pawl 154, pawl pivot 156, plunger 158, solenoid 160, and conductors 162, tensioner 126 is an asymmetrically damped tensioner. The addition of the components creates additional expense and complexity but allows additional optimization of system 10, in the form of reduced initial setting tensions by tensioner 126.

When accessory belt drive system 10 is to be operated in the generate mode, mode sensor 66 (FIG. 8) senses the presence of the generate mode. The mode sensor can be a separate electrical switch or relay operated anytime the motor/generator 12 receives electrical power to begin to drive accessory belt drive system 10, or can be part of an automotive ignition switch. Mode sensor 66 is commonly found within a controller for the motor/generator. The signal that is produced by mode sensor 66 is passed to signal processor 68, which can be a variety of electrical circuits to process the signal and make it compatible with actuator 70. The elements of this signal path and associated components, mode sensor 66, signal processor 68, and actuator 70 are known by those of ordinary skill in the art. Actuator 70, of this preferred embodiment, comprises solenoid 160, having plunger 158 and conductors 162. While this preferred embodiment contemplates use of electrical signals, sensors, processors, and actuators, mechanical, hydraulic, and pneumatic, signals, sensors, processors, and actuators are also envisioned.

The signal to solenoid 160 is passed via conductors 162. Solenoid 160 reacts to the signal by raising plunger 158, causing pawl 158 to rotate about pawl pivot 156 to the point of engaging pawl 154 with ratchet teeth 152. When so configured with this locking factor, tensioner pulley 28 can ratchet in the tensioning direction but is restrained, or locked, from moving in the loosening direction.

The engagement of pawl 154 with teeth 152 holds tensioner 126, which in turn restrains power transmission belt 30 to the path along which it was trained just prior to accessory belt drive system 10 being placed in the generate mode. Accordingly, tension on accessory belt drive system 10 does not lessen substantially when the mode is switched. Importantly, this allows the selection of a static tension, via spring rate of biasing spring 150 and overall geometry of tensioner 126, that is lower than that allowed by configurations heretofore available, without short term performance suffering unduly.

Figure 8:
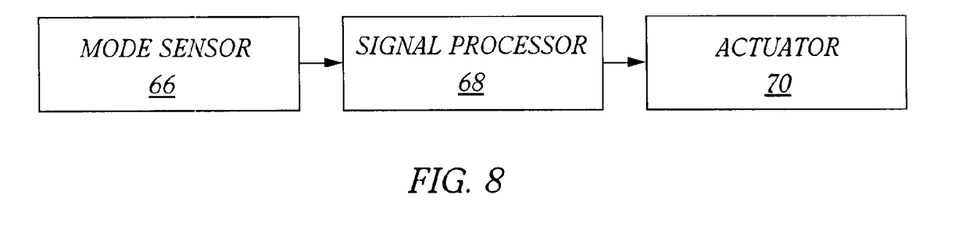
FIG. 8 is a block diagram of a control signal path.

When the mode switches, from generate to start, actuator 70 is deactivated, allowing pawl 154 to disengage from ratchet teeth 154, and allowing tensioner 126 to return to the start mode described above.

The activation of actuator 70 can be based strictly upon input from mode sensor 66 or upon additional parameters found in signal processor 68. For instance, time delay can be built into operation of signal processor 68 such that actuator 70 remains active for a set time after mode sensor 66 indicates that the mode has switched. Further, an advantage may be found in deactivating actuator 70 after a set time period regardless of when mode sensor 66 signals a mode switch. Further, mode sensor 66 can sense engine r.p.m., engine manifold pressure, torque upon crankshaft pulley 24, or torque upon motor/generator pulley 14 for determining a switch in modes.

Figure 5:
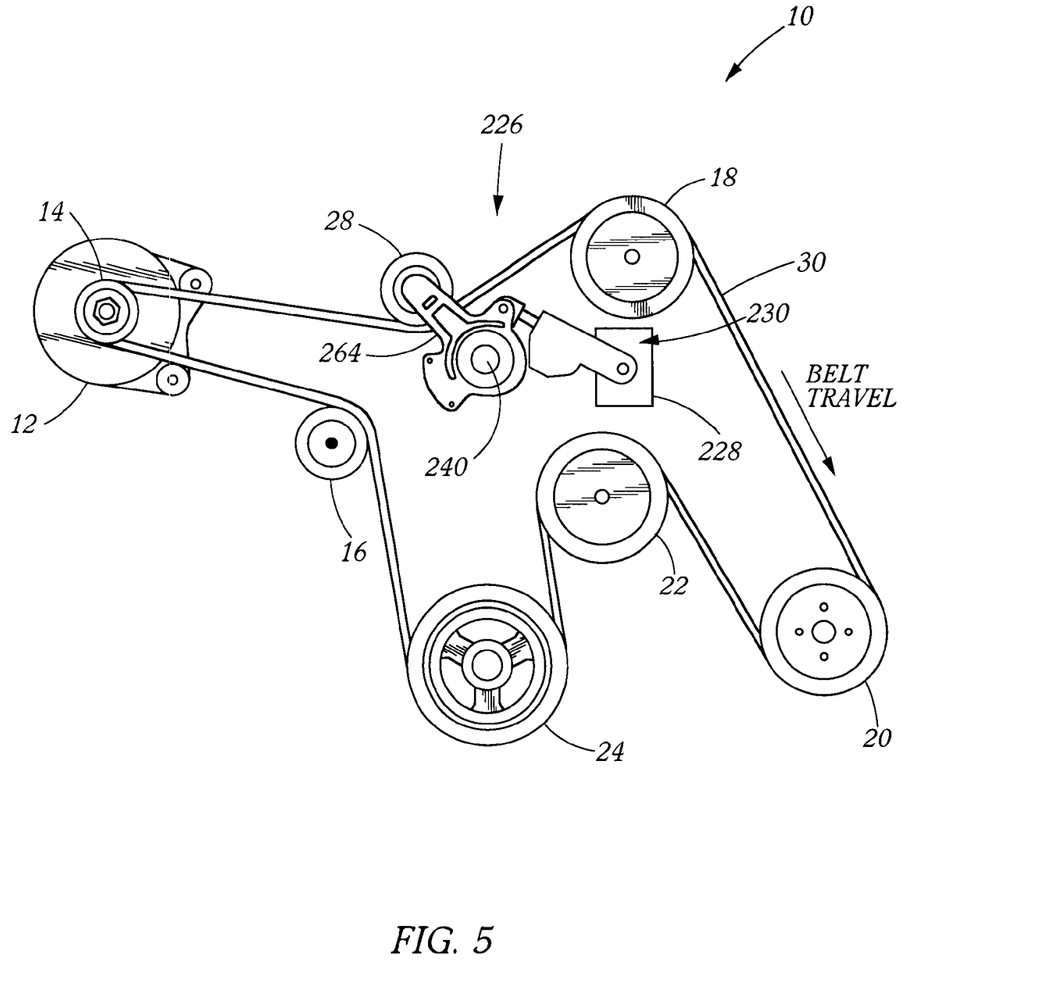
FIG. 5 depicts a schematic representation of an alternate preferred embodiment of an accessory belt drive system configuration including a motor/generator.

An alternative preferred embodiment is depicted in FIG. 5. This embodiment is the same as the prior embodiment with the exception of alternative tensioner 226, including mounting plate 228, damping module 230, main pivot 240, and movable member 264. Damping module 230 is depicted in greater detail in FIG. 6. Damping module 230 includes cylinder 232, piston 234, bypass tube 236, magnetic coil 238, connecting rod 242, connecting pin 244, body 246, and conductors 262. Cylinder 232 and bypass tube 236 are filled with rheological fluid 233. In this embodiment, rheological fluid 233 is magnetorheological in nature Tensioner 226 has a resilient member (not depicted) that provides spring rate biasing and therefore biases moveable member 264 in the tensioning direction, counterclockwise. The resilient member can include a torsion spring, a convolute spring, or one of a number of other torque producing resilient members. Further, it can include a lever arm acted upon by a linear resilient member to produce torque. Movement of moveable member 264 around main pivot 240 is mechanically communicated to connecting rod 242. Movement of connecting rod 242 causes piston 234 to move within cylinder 232, which forces rheological fluid 233 to transfer from cylinder 232 on one side of piston 234 to the cylinder 232 on the other side of piston 234 via bypass tube 236. This causes rheological fluid 233 to pass through the core of magnetic coil 238. Energization of magnetic coil 238 via conductors 262 impresses a magnetic field upon magnetorheological fluid 233 and thereby increases the viscosity of magnetorheological fluid 233.

Figure 6:
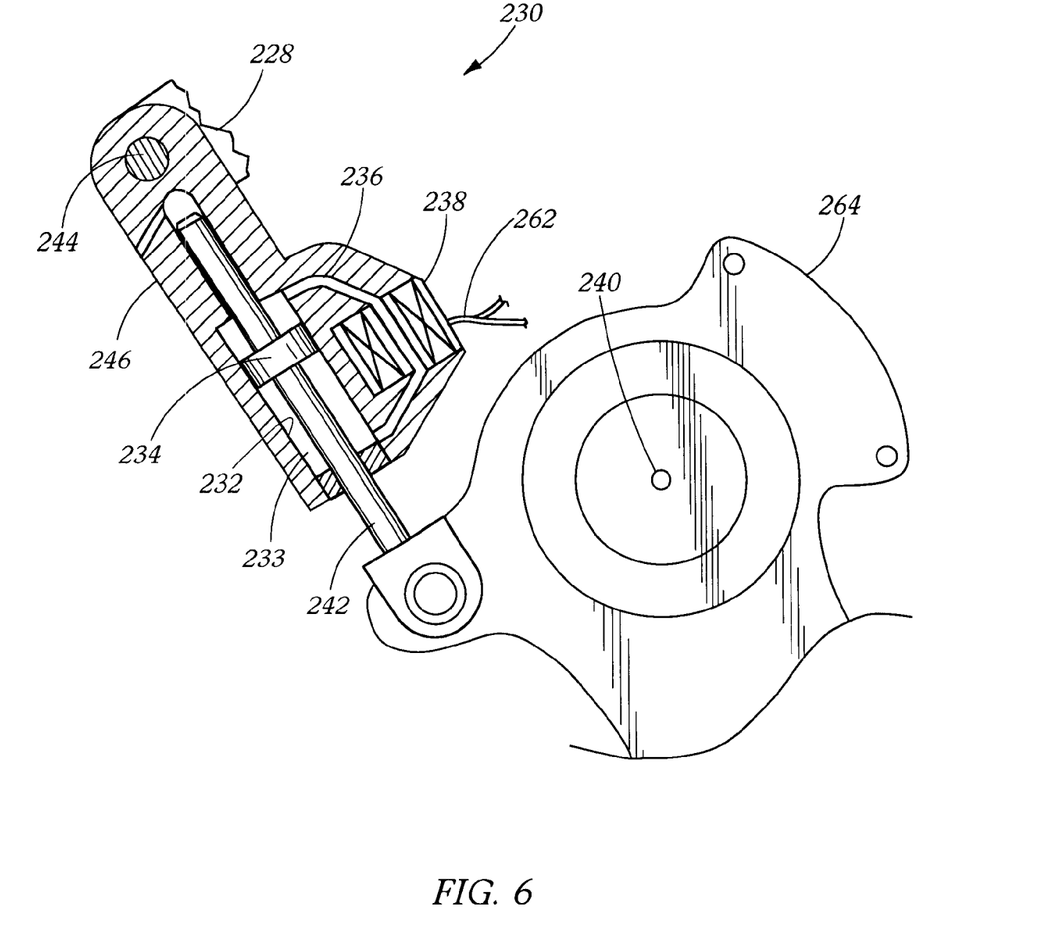
FIG. 6 is a detail of an alternate tensioner forming part of an alternate preferred accessory belt drive system including a motor/generator.

When magnetic coil 238 is not energized, rheological fluid 233 passes through bypass tube 236 in a relatively unrestricted manner. Thus movement of tensioner 226 is relatively free of damping. However, as coil 238 becomes energized, the resulting increase in viscosity of Theological fluid 233 creates a restriction of the flow of rheological fluid 233 through bypass tube 236. There is a direct relationship between the intensity of the field impressed upon rheological fluid 233 and its resulting viscosity. Depending upon the size and shape chosen for bypass tube 236, damping can be elevated to the point of essentially locking tensioner 226 in place.

The signal path depicted in FIG. 8 applies to this embodiment, as well. This embodiment allows additional flexibility on how, when and to what degree damping will be applied to tensioner 226. Selection of mode sensor 66 and manipulation of the logic within signal processor 68 allows fine-tuning of tensioner 226 damping. For instance, damping can be selected to be at a very high level, but less than that necessary to lock tensioner 226 in place, immediately upon accessory belt drive system 10 mode switching to generate. Tensioner 226 would accordingly be allowed to respond to the mode change by a slight relaxation in the loosening direction. Then after a brief period, the damping can be increased to lock tensioner 226 in the new location for the duration of the time accessory belt drive system 10 is in the start mode. Further, mode sensor 66 can be monitoring the activity or position of tensioner 226. This information can be processed by signal processor 68 to intelligently damp or lock tensioner 226 to accommodate accessory belt drive system 10 oscillation or vibration or to mimic the ratcheting effect of the prior described preferred embodiment.

Rheological fluid 233 can also be an electrorheological in nature. In such case, electrostatic plates (not depicted) replace magnetic coil 238. The general operation and relationships remain the same. Further, the ratcheting arrangement of the first described preferred embodiment comprising ratchet teeth 152, pawl 154, plunger 158, solenoid 160 and conductors 162 can be incorporated into tensioner 226 by affixing teeth 152 upon moveable member 264 and affixing the remaining portions in a stationary manner.

Figure 7:
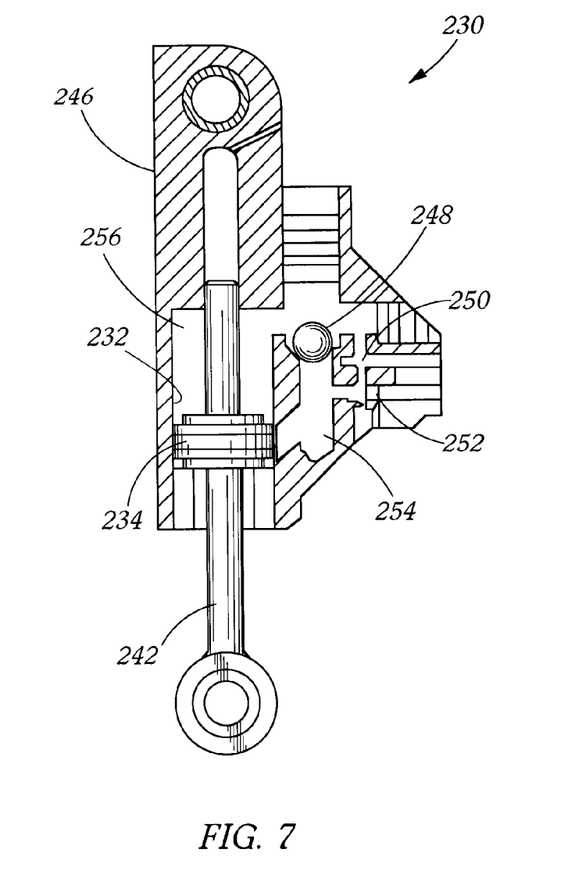
FIG. 7 is a detail of an alternate tensioner forming part of an alternate preferred accessory belt drive system including a motor/generator.

FIG. 7 depicts another embodiment specific to damping module 230. Here, hydraulic fluid 256 replaces theological fluid 233. Accordingly, magnetic coil 238, bypass tube 236, and conductors 262 are absent. In this embodiment, when tensioner 226 is moving in the tensioning direction, hydraulic fluid 256 is forced from the lower portion of cylinder 232 into major passageway 254, passed check ball 248 and into upper portion of cylinder 232. Since major passageway 254 is relatively large, tensioning direction of operation offers little damping. When tensioner 226 moves in the loosening direction, hydraulic fluid 256 is forced from upper portion of cylinder 232 into minor passageway 250, into the lower portion of major passageway 254 then into lower portion of cylinder 232. Minor passageway 250 is relatively small. Thus, substantial damping occurs in this direction of operation of tensioner 226. Control piston 252 is depicted as substantially retracted. If an actuator, similar to that depicted in FIG. 2, is included, control piston 252 can be selectively extended or retracted. The description of operation immediately above assumes control piston 252 to be fully retracted. If control piston 252 is fully extended, tensioner 226 can still move in the tensioning direction with minimal damping. However, minor passageway 250 is obstructed causing tensioner 226 to be locked against movement in the loosening direction.

An additional embodiment similar to that depicted in FIG. 4 is also envisioned. The ratchet teeth 152 and the mating teeth of pawl 154 can each be replaced with a form of teeth that are straight, as opposed to the depicted saw-toothed configuration. Actuation then locks tensioner 226 in both tightening and loosening direction. Ratcheting becomes unavailable. Further, all these teeth can be replaced with corresponding braking surfaces. This allows large control over damping being offered by tensioner 226 without bringing damping to the point of locking.

Damping combines with the forces supplied by the resilient member to result in a modified biasing, at the pulley/belt interface. This modification results in asymmetrical biasing even where the damping is symmetrical. This is due to the level of bias being the resultant of the bias delivered by any resilient member plus or minus the damping provided. Further, it can be said that any force or resistance added to the bias provided by the resilient member or spring of a tensioner that modifies the bias level ultimately delivered to the belt, such as damping, ratcheting or locking, is a direction reversal resistance.

The present invention found in the described embodiments accomplishes significant optimization of long-term and short-term performance while, at the same time, substantially minimizing cost and complexity.

The foregoing description and illustrative embodiments of the present invention have been shown on the drawings and described in detail in varying modifications and alternative embodiments. It should be understood, however, that the foregoing description of the invention is exemplary only, and that the scope of the invention is to be limited only to the claims as interpreted in view of the prior art. Moreover, the invention illustratively disclosed herein suitably may be practiced in the absence of any element which is not specifically disclosed herein.

We claim:

1. An improved internal combustion engine having a crankshaft, an accessory, a motor/generator, and a belt-drive system including a crankshaft pulley, an accessory pulley, a motor/generator pulley, a belt tensioner, a belt tensioner pulley, and a power transmission belt trained about said crankshaft pulley, said accessory pulley, said motor/generator pulley, and said belt tensioner pulley said belt tensioner pulley contacting said belt at a starting-slack-side span, the improvement comprising:

said tensioner being asymmetrically biased in a direction tending to cause said power transmission belt to be under tension;

said asymmetrical biasing being that biasing at a level that is no more than that provided by spring rate biasing, when external forces acting upon said tensioner and said tensioner pulley are less than necessary to overcome said spring rate biasing and would thereby tend to cause said tensioner pulley to move in a increasing belt tension direction, and that biasing that results from spring rate biasing and direction reversal resistance, when said external forces acting upon said tensioner and said tensioner pulley are greater than that necessary to overcome said spring rate biasing and thereby tend to cause said tensioner pulley to move in a decreasing belt tension direction; and, said direction reversal resistance is intermittently applied in response to operation mode of a motor/generator in mechanical communication with said motor/generator pulley.

2. The improvement of claim 1, further comprising:

said intermittent direction reversal resistance application being said tensioner being damped at a first damping level in the decreasing belt tension direction when said motor/generator is operating in a motor mode and said tensioner being damped at a second damping in the decreasing belt tension direction when said motor/generator is operating in a generator mode.

3. The improvement of claim 1, further comprising:

said intermittent direction reversal resistance application being said tensioner being locked against movement in the decreasing belt tension direction when said motor/generator is operating in a motor mode and said tensioner being not locked against movement in the decreasing belt tension direction when said motor/generator is operating in a generator mode.

4. The improvement of claim 1, further comprising:

said intermittent direction reversal resistance application responding to a control input resulting from said motor/generator operation mode.

5. The improvement of claim 4, wherein:

said control input is an electrical impulse.

6. An improved belt-drive system including a crankshaft pulley, an accessory pulley, a motor/generator pulley, a belt tensioner, a belt tensioner pulley, and a power transmission belt trained about said crankshaft pulley, said accessory pulley, said motor/generator pulley, and said belt tensioner pulley said belt tensioner pulley contacting said belt at a start-slack-side span, the improvement comprising:

said tensioner being asymmetrically biased in a direction tending to cause said power transmission belt to be under tension;

said asymmetrical biasing being that biasing at a level that is no more than that provided by spring rate biasing when external forces acting upon said tensioner and said tensioner pulley are less than necessary to overcome said spring rate biasing and would thereby tend to cause said tensioner pulley to move in a increasing belt tension direction, and that biasing that results from spring rate biasing and direction reversal resistance, when said external forces acting upon said tensioner and said tensioner pulley are greater than that necessary to overcome said spring rate biasing and thereby tend to cause said tensioner pulley to move in a decreasing belt tension direction; and, said direction reversal resistance is in intermittently applied in response to operation mode of a motor/generator in mechanical communication with said motor/generator pulley.

7. An improved method of tensioning a belt drive system having a crankshaft pulley, an accessory pulley, a motor/generator pulley, a belt tensioner, a belt tensioner pulley, and a power transmission belt trained about said crankshaft pulley, said accessory pulley, said motor/generator pulley, the improvement comprising:

biasing said belt tensioner pulley upon a start-slack-side span at a first biasing level when said tensioner pulley is moving in a belt tensioning direction, and biasing said belt tensioner pulley upon a start-slack-side span at a second biasing level when said tensioner pulley is moving in a belt loosening direction, said second biasing including a direction reversal resistance is intermittently applied in response to operation mode of a motor/generator in mechanical communication with said motor/generator pulley.

* * * * *